United States Patent [19]

Kosaka et al.

[11] Patent Number: 5,026,617
[45] Date of Patent: Jun. 25, 1991

[54] SEPARATOR FOR ALKALINE CELL AND ALKALINE CELL PREPARED BY USING THIS SEPARATOR

[75] Inventors: Takemi Kosaka, Tokyo; Fukashi Sakamoto; Setsuo Hidaka, both of Chiba, all of Japan

[73] Assignee: Idemitsu Kosan Company Limited, Tokyo, Japan

[21] Appl. No.: 472,945

[22] Filed: Jan. 31, 1990

[30] Foreign Application Priority Data

Feb. 13, 1989 [JP] Japan .................. 1-30984
Feb. 13, 1989 [JP] Japan .................. 1-30985

[51] Int. Cl.$^5$ ............................. H01M 2/16
[52] U.S. Cl. ...................... 429/206; 429/251
[58] Field of Search ............ 429/251, 206, 222, 223, 429/229, 27, 218

[56] References Cited

U.S. PATENT DOCUMENTS 4,287,276  9/1981  Lundquist, Jr. et al. ........... 429/206
4,327,164  4/1982  Feinberg et al. ................. 429/251 X
4,330,602  5/1982  O'Bell et al. ................... 429/251 X
4,331,746  5/1982  Sheibley ........................ 429/251 X
4,734,344  3/1988  Choi ............................ 429/206

FOREIGN PATENT DOCUMENTS

0024862  11/1987  European Pat. Off.

Primary Examiner—Anthony Skapars
Attorney, Agent, or Firm—Frishauf, Holtz, Goodman & Woodward

[57] ABSTRACT

A separator for an alkaline cell comprising a substrate of a separator and 0.1% to 10% by weight of amorphous ultra fine particles of titanium dioxide and/or hydrated titanium dioxide having a primary particle diameter of a maximum of 500 Å and a specific surface area of a minimum of 100 m$^2$/gram. An alkaline cell is also provided which incorporates the separator. The separator results in improved capability to retain electrolytic solution, improved resistivity against alkali and a low amount of residual gas generated during charge. Furthermore, the separator minimizes the electrical resistance, improves the resistivity against oxidation and prevents dendrite occurrence.

20 Claims, 6 Drawing Sheets

SEPARATOR FOR ALKALINE CELL AND ALKALINE CELL PREPARED BY USING THIS SEPARATOR

FIELD OF THE INVENTION

The present invention relates to a separator which is used for preparing an alkaline cell and an alkaline cell prepared by using this separator. More particularly, the invention primarily relates to the improvement of the separator used for preparing a secondary alkaline cell, wherein the invention provides the separator featuring the improved cell and the secondary alkaline cell prepared by using this improved separator. Furthermore, the invention relates to the improvement of the separator used for preparing the primary alkaline cell, wherein the invention provides the separator featuring an improved discharge characteristic and an improved retentivity of electrolytic solution and the primary alkaline cell prepared by using the improved separator.

BACKGROUND OF THE INVENTION

A variety of conventional secondary alkaline cells mainly composed of nickel-cadmium closed type cells are known. Nevertheless, these conventional secondary alkaline cells are not sufficient in the flat discharge characteristic or cannot stably discharge cell voltage under severe environmental conditions in encountered extremely cold and hot regions, or cannot fully sustain sufficient rounds of repeated charge and discharge, and as a result, these conventional secondary alkaline cells cannot fully satisfy the desired requirements of such cells.

To improve the overall performance characteristics of the secondary alkaline cells, the cell manufacturers have attempted to improve the separator by diminishing the electrical resistance of the separator, improving by the resistivity against alkali and oxidation, by minimizing the residual gas ($O_2$), by improving the retentivity of the electrolytic solution, and by preventing the electrode-plate material from generating dendrite, as means for achieving the aforesaid object.

For example, regarding the nickel-zinc closed type secondary alkaline cell, Japanese Patent Kokai Koho No. 165572/1980 proposes a zinc-alkaline secondary cell featuring the an improved cycle-life characteristic by introducing a composite separator composed of a fluorinated resin containing finely pulverized oxide like $TiO_2$, $ZrO_2$, or $HfO_2$ through 200 mesh filter and a layer of non-woven fabric.

Although application of these means certainly improves the performance characteristics of the secondary alkaline cells to some extent, further improvement is still demanded.

In order to further improve the cell performance characteristics, the present inventors conducted extensive studies and trials. As a result, the present inventors have successfully improved the characteristics of the separator used for preparing a second alkaline cell having improved retentivity of electrolytic solution, improved resistivity against alkali, decreased residual gas ($O_2$) generated during charge, reduced electrical resistance of the separator, improved resistivity against oxidation, and preventing dendrite from occurring, by effectively applying titanium dioxide having a specific primary particle diameter, a specific crystal form, and a specific surface area, from such. The titanium dioxide constitutionally having a hydrophillic property and a distinctly outstanding resistivity against alkali, oxidation, and chemicals, and the least electrical resistance. As a result of successful trials, the present inventors confirmed that the performance characteristics of the secondary alkaline cell could significantly be improved, and based on their acquired knowledge, the present inventors have eventually achieved the invention.

On the other hand, alkaline-manganese primary cells are commercially available as primary alkaline cells. However, these conventional alkaline-manganese primary cells are still defective in that the total discharge duration is very short, and yet, they cannot stably discharge current in severe environmental conditions such as in very cold and very hot regions, and these conventional alkaline-manganese primary cells cause the alkaline solution (functioning as an electrolytic solution) to externally leak, and thus, these cells do not always have satisfactory performance characteristics.

There is a positive demand for improving the discharge characteristic by expanding the cell capacity, diminishing the internal resistance, improving the discharge temperature characteristic, and for improving the retentivity of electrolytic solution by improving the prevention of the leakage of electrolytic solution altogether.

As an effective measure to improve the discharge characteristic and the retentivity of electrolytic solution, trials were undertaken to improve the overall characteristics of the separator, which is disposed between anode and the cathode, so that the requirements including the expansion of the cell capacity, reduction of the internal resistance, improvement of the discharge temperature characteristic and prevention of the leakage of electrolytic solution can be satisfied.

For example, Japanese Patent Kokoku Koho No. 4048/1979 proposes a method of improving the electrical characteristic of a primary alkaline cell by applying a separator composed of a composite layer made of polypropylene/titanium dioxide/polystylene. This composite layer is prepared by initially coating titanium dioxide over a thin film of polypropylene, followed by a drying process, applying a coating of polystylene solution over the dried layer, and conducting a final drying. Furthermore, Japanese Patent Kokoku Koho No. 30939/1981 proposes the provision of a separator which is chemically stable to the electrolytic solution and to the anode by producing the cell separator by filling a polymer of ethylene and acrylic acid into fine holes of the porous film mainly consisting of fine particles made from an inorganic compound which is insoluble in electrolytic solution.

According to the aforementioned prior art, the characteristics of the separator can be improved, and based on this, the discharge characteristic and the retentivity of electrolytic solution can also be improved. Nevertheless, further improvement of these requirements is still demanded.

In order to further improve the discharge characteristic and the retentivity of an electrolytic solution, the inventors continuously conducted extensive studies and trials. As a result, the inventors discovered that the characteristics of the separator usable for preparing a primary alkaline cell could significantly be improved by effectively applying titanium dioxide having a predetermined primary particle diameter, a specific crystal form, and a predetermined specific surface area by selecting it from such titanium dioxide inherently having a hydrophillic property and having outstanding resistivity against alkali, oxidation, and chemicals, and having the least electrical resistance. Based on the knowledge thus acquired, the present inventors have successfully achieved the invention.

SUMMARY OF THE INVENTION

An object of the present invention is to provide a separator having improved cell characteristics.

Another object of the present invention is to provide an alkaline cell having improved cell characteristics. The present invention provides a novel separator which is used for preparing an alkaline cell comprising a substrate of a separator and from 0.1 to 10% by weight based on the weight of the substrate of the separator of ultra-fine particles, wherein said ultra-fine particles are substantially composed of either titanium dioxide and/or hydrated titanium dioxide, and wherein each particle is constitutionally amorphous and has a maximum of 500Å (angstrom) as the primary particle diameter and a minimum of 100 square meters per gram as the specific surface area.

The present invention also provides an alkaline cell which is prepared by using a separator comprising a substrate of a separator and from 0.1 to 10% by weight based on the weight of the substrate of the separator of ultra-fine particles, wherein said ultra-fine particles are substantially composed of either titanium dioxide and/or hydrated titanium dioxide, and wherein each particle is constitutionally amorphous and has a maximum as 500Å (angstrom) of the primary particle diameter and a minimum of 100 square meters per gram as the specific surface area.

BRIEF DESCRIPTION OF THE DRAWINGS

FIGS. 1 and 2 are respectively characteristic charts depicting the results of the evaluations of the discharge characteristic for the examples and the comparative examples related to the invention wherein;

FIGS. 3 through 6 are respectively characteristic charts depicting the results of the evaluation of the discharge characteristic for the examples and the comparative examples related to the invention wherein;

DETAILED DESCRIPTION OF THE INVENTION

Since the alkaline cell embodied by the invention is quite similar to any conventional alkaline cell, except for the introduction of the separator embodied by the invention, the following description refers solely to the separator used for preparing this alkaline cell.

The substrate of the separator embodying the invention may be composed of either a non-woven fabric, or any conventional fabric, or a film. However, since the nonwoven fabric or any conventional fabric can retain electrolytic solution and allows ions to pass through it, it is desired that either of these fabrics be used for composing the separator. Actually, a wide variety of materials are available for composing the substrate of the separator related to the invention including the following: polyamide resin like nylon 66, polyethylene, polypropylene, acrylic resin, polytetrafluoroethylene, or polyvinyl alcohol, or cotton, for example. Of these, it is desired that any of the following be selected to compose the substrate including polypropylene for better resistivity against organic solvents, polyamide resin and polypropylene for better resistivity against alkali, and polyamide resin for a better wetting effect in aqueous solutions.

The embodiment of a invention specifically uses the separator comprising a substrate of a separator and ultra fine particles of titanium dioxide and/or hydrated titanium dioxide.

Concretely, the embodiment of the invention uses ultra fine particles of titanium dioxide and/or hydrated titanium dioxide having a maximum as 500 Å a the primary particle diameter (average particle diameter). Desirably, the primary particle diameter shall be in a range from 100 Å to a maximum of 300 Å, where each particle shall properly be amorphous and have a minimum of 100 $m^2$/gram of the specific surface area, preferably, a minimum of 120 $m^2$/gram according to the BET measurement. If the primary particle diameter is in excess of 500 Å it not only results in a diminished specific surface area and a lowered retentivity of electrolytic solution, but it also causes the quantity of the OH groups to diminish and the electrical resistance to increase, and thus, desirably, more than 500 Å for the primary particle diameter should not be used. Unless the ultra fine particles are amorphous, the specific surface area diminishes and the retentivity of the electrolytic solution is lowered, and yet, as a result of the decreased quantity of OH groups, electrical resistance increases. Furthermore, it is also undesirable to use such ultra fine particles having less than 100$m^2$/gram as the specific surface area because it not only results in the lowered retentivity of the electrolytic solution, but it also causes the electrical resistance to increase as a result of the decreased quantity of OH groups. To achieve satisfactory distribution of the particle diameter, desirably, more than 90% of the entire fine particles should have a primary particle diameter of 100 Å to a maximum of 500 Å. The amorphous state need not be perfect, but the embodiment also allows for the use of substantially amorphous fine particles.

The ultra fine particles used for embodying the invention may be composed of either titanium dioxide or hydrated titanium dioxide or a blend of these.

These ultra fine particles can be produced by vapor-phase hydrolysis of titanium alkoxide, for example. A typical example of a method of producing such ultra fine particles based on the above art is disclosed in Japanese Patent Kokai Koho No. 201604/1986 and Japanese Patent Kokai Koho No. 186418/1985.

The separator embodied by the invention contains 0.1% by weight through 10% by weight, desirably 0.5% by weight through a maximum of 5% by weight of the above ultra fine particles based on the weight of the substrate of the separator. If the content of the ultra fine particles are less than 0.1% by weight, it results in the insufficient effect of the addition of fine particles. Conversely, if the content of the ultra fine particles are in excess of 10% by weight, it causes the ultra fine particles to drop out of the separator, or it causes the size of the cell to be enlarged by the expansion of the volume of the separator which results in increased cost.

As far as the substrate of the separator contains the above ultra fine particles, any available means to immerse them in the substrate can be employed. For example, the substrate of the separator can be impregnated with the ultra fine particles either by (1) coating or impregnating fine particles over or into the substrate, or by (2) adding these fine particles to the substrate during the production process. More particularly, the above method (1) can be implemented by applying those sequential processes described below. (i) Blending of the ultra fine particles with more than one of those materials including polyvinyl alcohol, latex, acrylic resin, water, and carboxymethyl cellulose. (ii) Either coating the above blend over the substrate of the separator or impregnating the substrate in an aqueous emulsion of the blended compound. The second method can be implemented by blending the ultra fine particles with polyamide fibers or the like constituting the substrate before eventually producing non-woven fabric.

The separator embodied by the invention is ideally suited for preparing an alkaline cells. Concretely, the separator embodied by the invention is ideally applicable to secondary alkaline cells including the following; nickel-cadmium closed type secondary alkaline cell, nickel-zinc closed type secondary alkaline cell, nickel-hydrogen closed type secondary alkaline cell, iron-nickel secondary alkaline cell, zinc-air secondary alkaline cell, and aluminium-air secondary alkaline cell, etc.

Furthermore, the separator embodied by the invention is effectively applicable to the primary alkaline cells, such as alkaline-manganese dry cell, oxidized silver cell, mercury cell, and air-cell, or the like.

As is clear from the foregoing description, the separator embodied by the invention features the improved capability to retain electrolytic solution, improved resistivity against alkali, and the least storage of residual gas during charge. Furthermore, the separator embodied by the invention minimizes the electrical resistance, improves the resistivity against oxidation, and prevents dendrite from occurring.

As a result, the application of the separator embodied by the invention allows for the production of such secondary cells provided with increased cycles of the repeated charge and discharge, increased cell capacity, and improved flatness of the dischargeable voltage.

Furthermore, the application of the separator embodied by the invention allows for the production of such secondary cells featuring improved temperature characteristic, diminished internal resistance, and improved capability to prevent occurrence of leakage of electrolytic solution from the cells.

Therefore, the application of the separator embodied by the invention securely improves the overall performance of the secondary cells. In particular, because of this, the separator can effectively be used for composing those secondary alkaline cells such as the nickel-cadmium closed type secondary alkaline cells, the nickel-zinc closed type secondary alkaline cells and the nickel-hydrogen closed type secondary alkaline cells, for example.

The separator embodied by the invention is extremely satisfactory in electrical resistance, retentivity of electrolytic solution, resistivity against alkali, prevention of occurrence of the leakage of electrolytic solution, and in internal resistance.

Therefore, according to the separator embodied by the invention, overall discharge characteristics can securely be improved like increase in the cell capacity, least internal resistance, and improvement in the discharge characteristic independent of temperature, for example.

Furthermore, according to the separator embodied by the invention, prevention of leakage of electrolytic solution is improved, thus eventually promoting the capability to retain electrolytic solution.

Accordingly, the separator embodied by the invention is effectively applicable to the formation of the separator of primary alkaline cells as well.

The present invention is described in greater detail with reference to the following examples.

PREPARATION EXAMPLE

Preparation of ultra fine particles composed of titanium dioxide and hydrated titanium dioxide First, the inventors evaporated titanium tetraisopoxide ($Ti(OC_3H_7)_4$) by applying a vaporizer, in which nitrogen gas serving as carrier gas was used, and then the inventors injected steam in order to generate 0.05 mol % of water content. Next, the inventors injected this material into a reactor having a dimension of 30 mm for the inner diameter and the inner wall so that ultra fine particles of titanium dioxide could be bonded to the inner wall. The inventions then generated a pyrolysis reaction and hydrolysis reaction at 350° C. Immediately after completing these reactions, the inventors cooled the product of the reaction, and then collected ultra fine particles that adhered to the surface of the cooling tube. After observing the collected fine particles with an electronic microscope, the inventors confirmed that the fine particles had a the primary particle diameter (average particle diameter) of and 200 Å a particle diameter distribution of 100 Å through a maximum of 300 Å. Then, after analyzing the X-ray diffraction pattern, the inventors confirmed that their produced fine particles were amorphous in the constitution. After checking the produced fine particles via the BET method using nitrogen gas, the inventors confirmed that the produced fine particle had a specific surface are of 126 $m^2$ per gram.

EXAMPLE 1

First, the inventors prepared an aqueous emulsion containing 7% by weight of ultra fine particles (hereinafter called titania) composed of titanium dioxide and hydrated titanium dioxide yielded from the above Preparation Example, 7% by weight of polyvinyl alcohol (PVA), and 2% by weight of carboxymethyl cellulose (CMC), and then immersed a lengthy non-woven fabric made of nylon 66 in the prepared aqueous emulsion before drying it at 120° C. for 2 hours. The inventors confirmed that the dried non-woven fabric contained 5% by weight of titania.

Next, using the titania-contained non-woven fabric which served as the separator, an electrolytic solution containing 40% KOH solution, electrode plates made of nickel plate and cadmium plate, the inventors produced AA-size nickel-cadmium closed type cells having 500 mAh of capacity.

Figure 1:
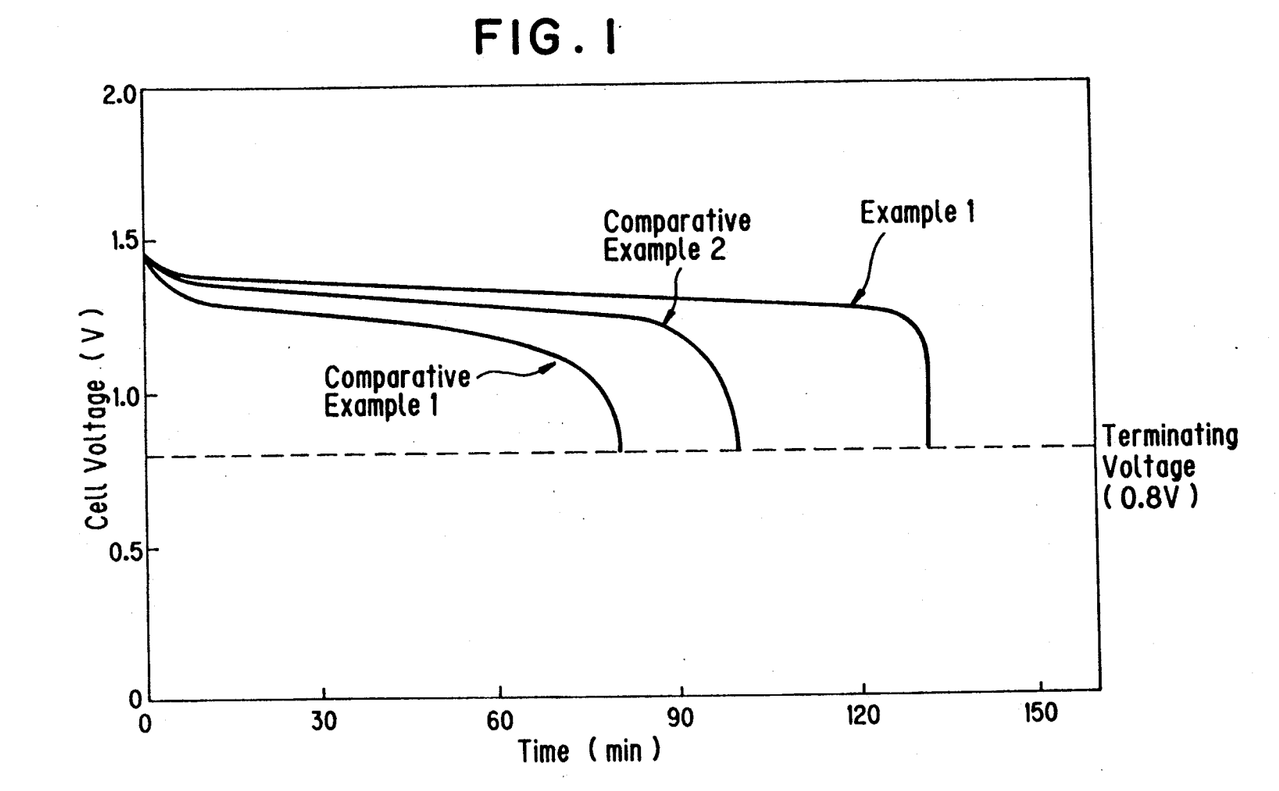
FIG. 1 depicts the discharge characteristic of nickel-cadmium closed type cells.

The inventors then conducted tests for checking the discharge characteristics of the produced AA-size nickel-cadmium closed type cells by operating a cell charger/discharger (model HJ-201B, a product of Hokuto Denko K. K.) at 20±2° C. of room temperature and at 2.5 mA cm² of the discharge current density. The test results are shown in FIG. 1. These tests proved that the produced AA-size nickel cadmium closed type cells stably maintained the flatness of the discharge characteristic for a long time. Concretely, it took 132 minutes before the discharge rate was eventually lowered to 57%, in other words, from the startup 1.4 VDC to the terminating voltage 0.8 VDC.

The inventors repeatedly executed the charge tests against the produced AA-size nickel-cadmium closed type cells for 3 hours based on 2 mA/cm² of the charge current density and the charge/discharge tests based on 2.5 mA/cm² of the discharge current density until the cell voltage lowered to 57%. As result inventors confirmed that the decline of the discharge capacity was very slow to allow the tested cells to be charged and discharged by 600 cycles until the discharge capacity eventually reached below 60% of the initial cell capacity.

Table 1 shows various characteristics of the separator and the cell embodied by the invention. The produced nickel-cadmium closed type cells reflecting the Example 1 of the invention proved to be superior to those corresponding cells produced for the Comparative Examples 1 and 2 with respect to the electrical resistance, retentivity of electrolytic solution, resistivity against alkali and oxidation, prevention of leakage of electrolytic solution, and the internal resistance. By virtue of these advantageous properties, it is likely that the produced cells for the first embodiment generated quite satisfactory cell characteristics including the discharge characteristic and the repeatable service life.

COMPARATIVE EXAMPLE 1

The inventors produced the nickel-cadmium closed type cells by following the same way as was done for the Example 1, except for the deletion of titania from the separator used for the Example 1. The inventors then checked the discharge characteristic and overall characteristics of the separator and the cells. Test results are shown in FIG. 1 and Table 1.

Those cells produced for the Comparative Example 1 proved to be inferior to those cells of the Example 1 in the flatness of discharge characteristic. The voltage of the cells of the Comparative Example 1 lowered to 57% in 80 hours, thus proving a faster decline than that of the cells of the Example 1.

COMPARATIVE EXAMPLE 2

Except for the introduction of commercially available titania fine particles (P-25, a product of Degussa Company) instead of using the titania produced by the Preparation Example and used for the Example 1, the inventors prepared the separator made of the titania-contained non-woven fabric for producing cells of the Comparative Example 2. As a result of observations of the purchased titania fine particles via an electronic microscope, it was confirmed that these titania particles had a primary particle diameter (average particle diameter) of 350Å and a of the particle diameter of 50 through 500Å. As a result of checking the X-ray diffraction pattern, the inventors confirmed that the purchased titania fine particles were mainly composed of the anatase type titanium dioxide. The inventors also confirmed that the purchased titania fine particles had a specific surface area via the BET-applied analysis of 50 m² per gram.

Next, except for the introduction of the above separator, the inventors produced nickel-cadmium closed type cells by following the same was as was done for the Example 1. The inventors then checked the discharge characteristic and overall characteristics of the separator and the produced cells. The test results are shown in FIG. 1 and Table 1. The cells produced for the Comparative Example 2 generated a better flatness of the discharge characteristic than that of the cells produced for the Comparative Example 1. Nevertheless, the flatness was still inferior to that of the cells produced by the Example 1. Ninety minutes elapsed for the cells produced by the Comparative Example 2 before the cell voltage eventually lowered to 57%.

As a result of the charge/discharge tests done for the cells of the Comparative Example 2, the duration of the discharge capacity of these cells proved to be superior to that of the Comparative Example 1, but these cells were still inferior to the cells of the Example 1 in performance because these cells merely sustained 500 rounds of the charge/discharge cycles before the discharge capacity lowered below 60% of the initial cell capacity.

EXAMPLE 2

Using the cell charger/discharger identical to which was used for the Example 1, the inventors checked the discharge characteristic of the AA-size nickel-cadmium closed type cells produced by the Example 1 based on 2.5 mA/cm² of the discharge current density at 0° C. and 60° C. These cells generated a quite satisfactory flatness of the discharge characteristic. 130 minutes elapsed for these cells before the cell voltage eventually lowered to 57% at 0° C. and 60° C., concretely, from the initial 1.4 VDC to 0.8 VDC. As a result, these cells proved to have quite satisfactory performance, almost being equivalent to the test results achieved under room temperature which recorded 132 minutes of the cell voltage decrease until reaching 57%.

It was eventually confirmed that the nickel-cadmium closed type cell incorporating the separator containing amorphous titania particles having a sufficient specific surface area could generate stable discharge characteristics throughout an extensive range of temperature from 0° C. to 60° C.

COMPARATIVE EXAMPLE 3

Using the cell charger/discharger identical to that which was cited above, the inventors checked the discharge characteristic of the AA-size nickel-cadmium closed type cells at 0° C. and 60° C. It took 65 minutes at 0° C. before the tested cell voltage lowered to 57%, proving a significantly fast decrease. On the other hand, it took 87 minutes at 60° C. before the cell voltage lowered to 57%, thus proving a substantial extension of the duration. As was found from the test under room temperature, the flatness of the voltage discharge characteristic in the Comparative Example 3 proved to be inferior to those which were achieved by the cells of the Example 1 and Example 2 after completing those tests done at 0° C. and 60° C.

As is clear from the above results, depending on the surrounding temperature, the nickel-cadmium closed type cells without titania significantly varied in their performance characteristic. In particular, the duration of the discharge in a cold temperature environment significantly decreased.

TABLE 1

|  |  | Example 1 | Comparative Example 1 | Comparative Example 2 |
|---|---|---|---|---|
| Electrode | | Ni—Cd | Ni—Cd | Ni—Cd |
| Used titanium dioxide | | Preparation Example | — | Commercially Available Product |
| Characteristic of the separator | Electrical[*1] resistance (mΩ cm) | 70 | 150 | 100 |
| | Solution[*2] retentivity (ml/m$^2$) | 55 | 50 | 52.5 |
| | Resistivity[*3] against alkali | Unchanged Decreased by 0.2 wt % | Deformed by contraction Decreased by 7 wt % | Slightly deformed by contraction Decreased by 1 wt % |
| | Resistivity[*4] against oxidation | Decreased by 0.5 wt % | Decreased by 10 wt % | Decreased by 2 wt % |
| Characteristic of the cell | Solution-leaked cell[*5] (number) | 3 | 25 | 10 |
| | Internal resistance (Ω) | 3.0 | 4.2 | 3.6 |
| | Recycled[*6] service life (cycle) | 600 | 400 | 500 |

[*1]: 50% by weight at 30° C. Checked in KOH solution.
[*2]: Volume of KOH aqueous solution (50% by weight) needed until the solution starts to drip down from the separator after dripping the solution onto the separator.
[*3]: Condition after immersing the separator in 50% wt KOH aqueous solution at 80° C. for 5 hours and the decrease rate of the weight.
[*4]: Decreased rate of the weight after immersing the separator sandwiched by nickel electrodes in 50% KOH aqueous solution, followed by generation of voltage at 200 mA, and finally caused oxygen gas to be generated for a period of a month.
[*5]: The number of the cells (out of 100 pieces of the tested cells) which caused the electrolytic solution to externally leak during the storage test which lasted for 120 days at 45° C. and 90% RH.
[*6]: Immediately after changing the cells by applying 2.0 mA/cm$^2$ of the charge current density at room temperature, the inventors repeated the charge/discharge tests by applying 2.5 mA/cm$^2$ of the discharge current density until the cell voltage lowered to 57% (from 1.4 VDC to 0.8 VDC).

EXAMPLE 3

First, the inventors immersed a length of non-woven fabric made of nylon 66 in an aqueous emulsion containing 7% by weight of titania produced by the Preparation Example, 7% by weight of polyvinyl alcohol (PVA) and 2% by weight of carboxymethyl cellulose (CMC), and then thermally dried the wet fabric at 120° C. for, 2 hours. The dried fabric contained 5% by weight of the titania ingredient.

Next, using the titania-contained non-woven fabric serving as the separator, an electrolytic solution containing 40% KOH solution, and electrodes made of nickel plate and zinc plate, the inventors produced the nickel-zinc closed type cells of the AA-size each having 500 mAh of capacity.

Figure 2:
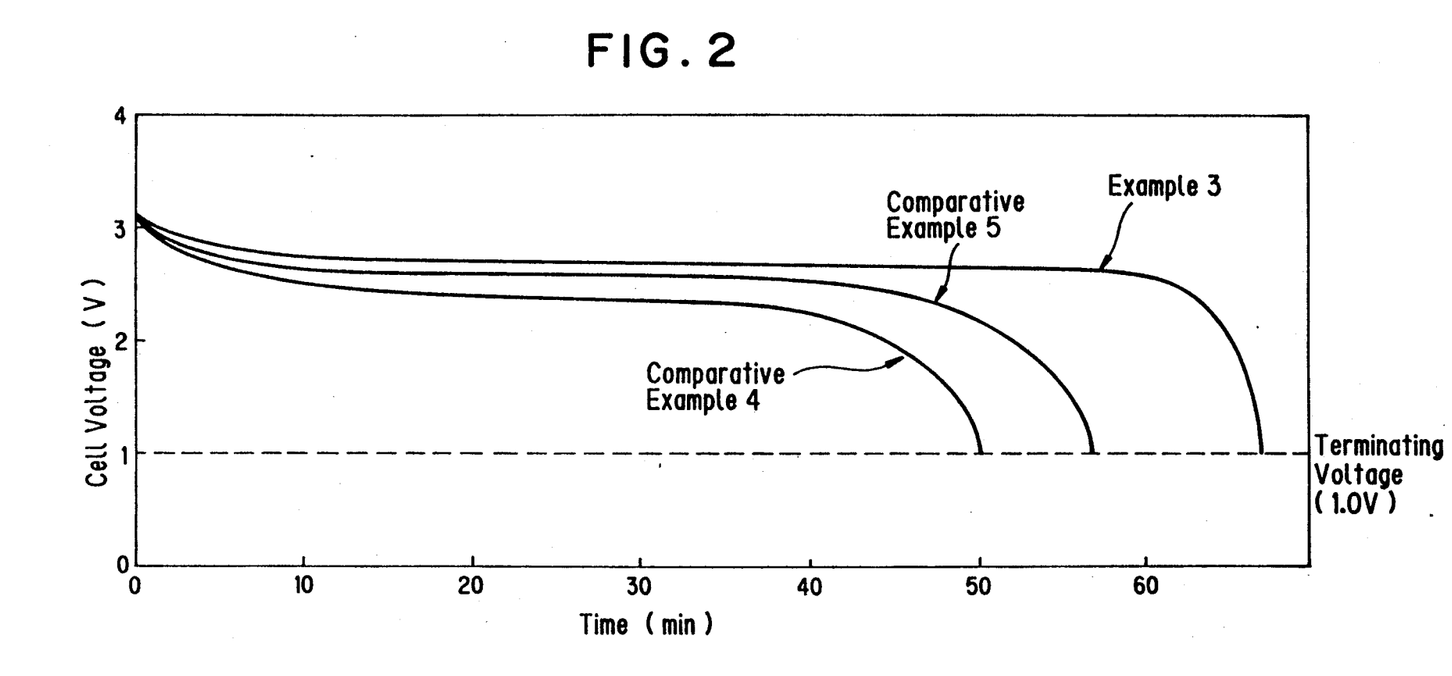
FIG. 2 depicts the discharge characteristic of nickel-zinc closed type cells.

Next, using the cell charger/discharger (model HJ-201B, a product of Hokuto Denko K. K.), the inventors checked the discharge characteristic of the produced nickel-zinc closed type cells based on 5.0 mA/cm$^2$ of the discharge current density at room temperature (20±2° C.). The test results are shown in FIG. 2. The produced nickel-zinc closed type cell proved to be capable of stably maintaining the flatness of the discharge characteristic for a long while. Concretely, it took 67 minutes before the cell voltage eventually lowered to 33%, i.e., from 3.0 VDC to 1.0 VDC of the terminating voltage.

The inventors also repeatedly executed the charge/discharge tests by applying a 3-hour charge based on 2.0 mA/cm$^2$ of the charge current density and the discharge based on 5.0 mA/cm$^2$ of the discharge current density before the cell voltage eventually lowered to 33%. As a result, the discharge capacity indicated a very slow decline, and yet, the inventors could repeatedly charge and discharge current for 400 cycles before the discharge capacity eventually became lower than 60% of the initial cell capacity.

Table 2 shows the performance characteristic of the separator and the cell of the Example 3. The separator of the nickel-zinc closed type cell based on the Example 3 proved to be superior to those of the Comparative Examples 4 and 5 in the electrical resistance, retentivity of electrolytic solution, resistivity against alkali and oxidation, prevention of leakage of solution, and the internal resistance. By virtue of these advantageous properties, it is likely that the produced nickel-zinc closed type cells generated quite satisfactory cell characteristics including the discharge characteristics and the repeated cycles of service life.

COMPARATIVE EXAMPLE 4

Except for the deletion of titania fine particles from the separator, by following the same way as was done for the Example 3, the inventors produced nickel-zinc closed type cells using the separator made of nylon-66 non-woven fabric like the one used for the Example 3. The inventors then checked the discharge characteristic and overall characteristics of the separator and the cell. The test results are shown in FIG. 2 and Table 2. The inventors confirmed from the above evaluation that the discharge characteristic of the cell of the Comparative Example 4 was inferior to those cells produced by the Example 3 in the flatness. It merely took 50 minutes before the cell voltage lowered to 33%.

The inventors detected from the charge/discharge test done against the nickel-zinc cell produced for the Comparative Example 4 that the discharge capacity of this cell declined more quickly than the corresponding nickel-zinc cell produced by Example 3. The nickel-zinc cell produced for Comparative Example 4 merely rendered 300 rounds of the charge/discharge cycles before the discharge capacity become lower than 60% of the initial cell capacity.

COMPARATIVE EXAMPLE 5

Except for the introduction of commercially available titania fine particles (P-25, a product of Degussa Company, which was also used for the Comparative Example 2), instead of using the titania fine particles produced by the Preparation Example, the inventors produced nickel-zinc closed type cells by following the same way as was done for the Example 3. The inventors then checked the discharge characteristic and overall characteristics of the separator and the cell. The rest results are shown in FIG. 2 and Table 2.

The nickel-zinc closed type cells produced for the Comparative Example 5 proved to be superior to the Comparative Example 4 in the flatness of the discharge characteristic, but it was still slightly inferior to the Example 3 in the flatness of the discharge characteristic. It merely took 57 minutes before the cell voltage eventually lowered to 33%.

The inventors detected from the charge/discharge tests that the duration of the discharge capacity was superior to that of the Comparative Example 4, but the duration of the discharge capacity of the Comparative Example 5 was not as satisfactory as that which was achieved by the Example 3, where the nickel-zinc closed type cell produced for the Comparative Example 5 merely yielded a total of 350 rounds of the charge/discharge cycle before the discharge capacity eventually became lower than 60% of the initial cell capacity.

EXAMPLE 4

First, the inventors immersed a lengthy non-woven fabric made of nylon 66 in an aqueous emulsion containing 7% by weight of titania fine particles (produced by the Preparation Example) composed of titanium dioxide and hydrated titanium dioxide) 7% by weight of polyvinyl alcohol (PVA), and 2% by weight of carboxymethyl cellulose (CMC), and then thermally dried the wet fabric at 120° C. for 2 hours. The dried fabric contained 5% by weight of the titania ingredient.

Next, using the separator made of the titania-contained non-woven fabric, an electrolytic solution containing 40% KOH solution, and electrode plates made from zinc and manganese dioxide, the inventors produced AA-size alkaline-manganese dry cells.

Figure 3:
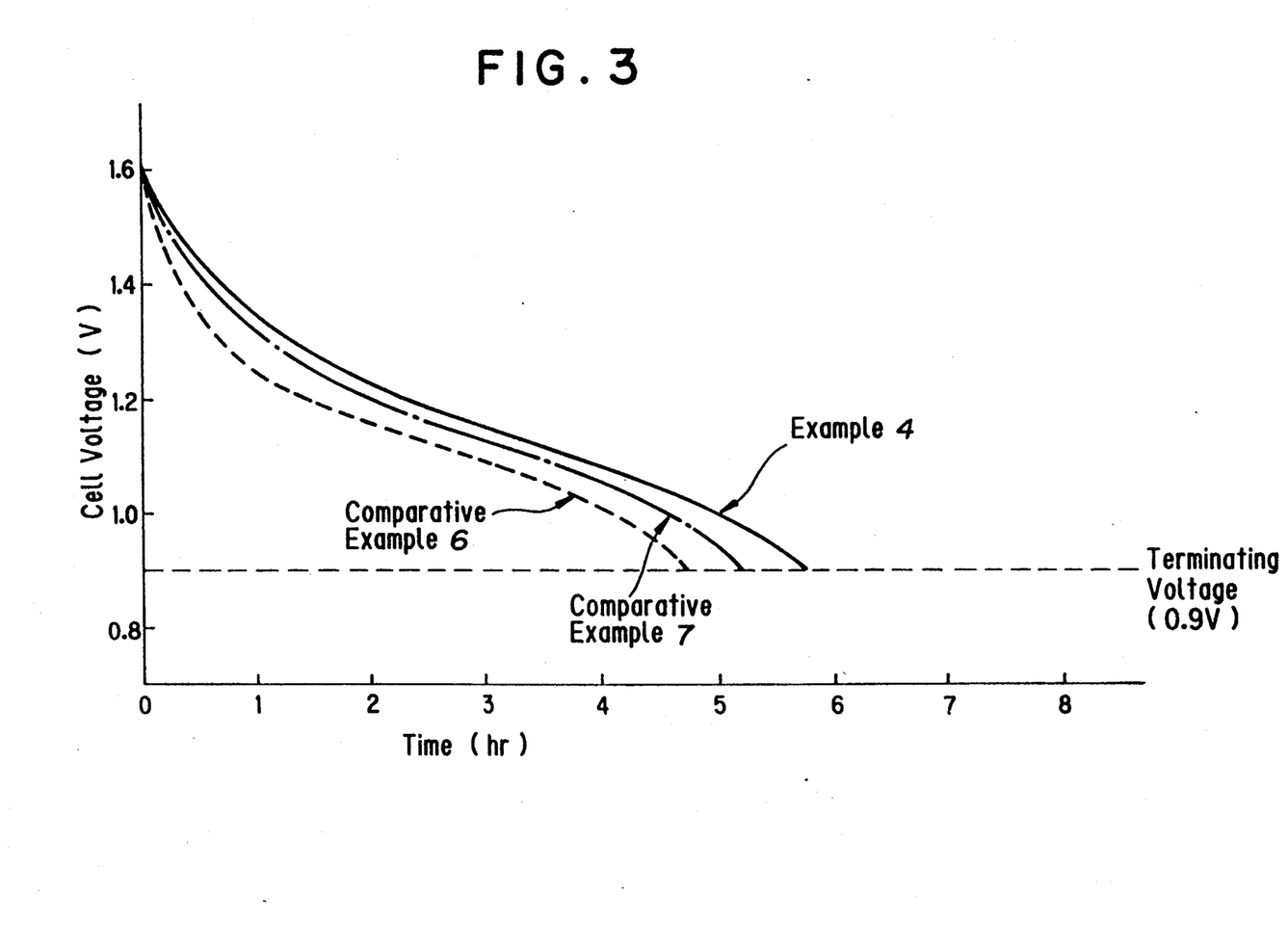
FIG. 3 depicts the discharge characteristic of alkaline-manganese cells.

Then, by operating the cell charger/discharger (model HJ201B, a product of Hokuto Denko K.K.), the inventors discharged 300 mA of constant current from the produced alkaline-manganese dry cells at room temperature (20±2° C.). The test results are shown in FIG. 3. It took 5.8 hours before the cell voltage eventually lowered to 0.9VDC of the terminating voltage. This provides a quite satisfactory discharge characteristic surpassing that of the following Comparative Examples 6 and 7.

Table 3 shows the performance characteristics of the separator and the alkaline-manganese dry cells. The alkaline-manganese dry cell produced by the Example 4 proved to be superior to those corresponding cells produced for the Comparative Examples 6 to 9 with respect to the electrical resistance, retentivity of electrolytic solution, and in the prevention of leakage of this solution from the cell. It is likely that, by virtue of these advantageous properties, the alkaline-manganese dry cells of the Example 4 generated quite satisfactory cell characteristics.

COMPARATIVE EXAMPLE 6

Except for the deletion of titania fine particles from the separator, by following the same way as was done for the Example 4 and applying the separator made of

TABLE 2

| | | Example 3 | Comparative Example 4 | Comparative Example 5 |
|---|---|---|---|---|
| Electrode | | Ni—Zn | Ni—Zn | Ni—Zn |
| Used titanium dioxide | | Preparation Example | — | Commercially Available Product |
| Characteristic of the separator | Electrical*1 resistance (mΩ cm) | 70 | 150 | 100 |
| | Solution retentivity*2 (ml/m$^2$) | 55 | 50 | 52.5 |
| | Resistivity*3 against alkali | Unchanged Decreased by 0.2 wt % | Deformed by contraction Decreased by 7 wt % | Slightly deformed by contraction Decreased by 1 wt % |
| | Resistivity*4 against oxidation | Decreased by 0.5 wt % | Decreased by 10 wt % | Decreased by 2 wt % |
| Characteristic of the cell | Solution-*5 leaked cell (number) | 3 | 25 | 10 |
| | Internal resistance (Ω) | 3.0 | 4.2 | 3.6 |
| | Recycled*6 service life (cycle) | 400 | 300 | 350 |

*1 through *5: Descriptions are exactly identical to those *1 through *5 shown in Table 1.
*6 Immediately after executing charge for 3 hours at room temperature based on 2.0 mA/cm$^2$ of the charge current density, the inventors repeatedly checked the charge/discharge characteristics based on 2 mA/cm$^2$ of the discharge current density until the cell voltage eventually lowered to 33%, i.e.. from 1.0 VDC to 1.0 VDC.

nylon 66 non-woven fabric, the inventors produced alkaline-manganese dry cells. The inventors then checked the discharge characteristic and overall characteristics of the separator and the cell. Test results are shown in FIG. 3 and Table 3. It took 4.8 hours before the cell voltage eventually lowered to 0.9 VDC of the terminating voltage, thus proving the inferior effect to that which was achieved by the corresponding dry cells of the Example 4.

COMPARATIVE EXAMPLE 7

Except for the introduction of commercially available titania particles (P-25, a product of Degussa Company), instead of using the titania produced by the Preparation Example, in the same way as was done for the Example 4, the inventors produced a separator made of the titania-contained non-woven fabric.

Next, following the same was as was done for the Example 4 except for the application of the above separator, The inventors produced alkaline-manganese dry cells. The inventors then checked the discharge characteristic and overall characteristics of the separator and the cell. The test results are shown in FIG. 3 and Table 3.

It took 5.2 hours before the voltage of the dry cell of the Comparative Example 7 eventually lowered to 0.9 VDC of the terminating voltage. Although being superior to the Comparative Example 6, the duration of the discharge voltage was not as satisfactory as that of Example 4.

EXAMPLE 5

Using the same cell charger/discharger as that which was used for the Example 4, the inventors checked the discharge characteristic of the AA-size alkaline-manganese dry cells produced by the Example 4 by constantly discharging 300 mA of current at 0° C. and 60° C. As a result, during the test at 0° C., the discharge voltage lowered to 0.9 VDC of the terminating voltage 5.6 hours later. During the test at 60° C., the discharge voltage lowered to 0.9 VDC of the terminating voltage 6.2 hours later. These results proved that the discharge characteristic of these cells was almost equivalent to that which was proven at room temperature (20±2° C.).

The inventors confirmed that the alkaline-manganese dry cell incorporating the separator containing amorphous titania fine particles having substantial specific surface area generated stable discharge characteristic in extensive temperatures ranging from 0° C. to 60° C.

COMPARATIVE EXAMPLE 8

Using the same cell charger/discharger as that which was used for the preceding examples, the inventors checked the discharge characteristic of the AA-size alkaline-manganese dry cells produced for the Comparative Example 6 by constantly discharging 300 mA of current at 0° C. and 60° C. During the discharge test at 0° C., the cell voltage eventually lowered to 0.9 VDC of the terminating voltage 3.6 hours later, thus proving a significantly fast decline. During the test at 60° C., the cell voltage eventually lowered to 0.9 VDC of the terminating voltage 5.4 hours later, thus proving a substantially extended duration. Nevertheless, these results were still inferior to those which were achieved by Examples 4 and 5.

As is clear from the above results, the performance characteristic of the alkaline-manganese dry cell dispensing with titania fine particles was significantly variable with respect to surrounding temperature. In particular, the duration of the discharge significantly diminished in cold temperatures.

COMPARATIVE EXAMPLE 9

Using the same cell charger/discharger as that which was used for the preceding examples, the inventors checked the discharge characteristic of the AA-size alkaline-manganese dry cells produced for Comparative Example 7 by constantly discharging 300 mA of current at 0° C. and 60° C. In the course of the discharge test at 0° C., the cell voltage eventually lowered to the terminating voltage 4.4 hours later. This proved a useful effect of the titania fine particles compared to the corresponding dry cells of the Comparative Example 8. Nevertheless, the duration of the discharge was not as satisfactory as that which was achieved by Examples 4 and 5. In the course of the discharge test at 60° C., the cell voltage eventually lowered to the terminating voltage 5.5 hours later. This indicates that the discharge duration was substantially extended. Nevertheless, still it was not as satisfactory as that which was achieved by the Examples 4 and 5. As is obvious from the above results, it was confirmed a that satisfactory performance (discharge characteristic) was achieved by applying the amorphous titania fine particles having a substantial specific surface area to those embodiments mentioned above compared to those examples which used other kinds of titania.

TABLE 3

|  |  | Examples 4 and 5 | Comparative Examples 6 and 8 | Comparative Examples 7 and 9 |
|---|---|---|---|---|
| Electrode |  | Zn—MnO$_2$ | Zn—MnO$_2$ | Zn—MnO$_2$ |
| Used titanium dioxide |  | Preparation Example | — | Commercially Available Product |
| Characteristic of the separator | Electrical*[1] resistance (mΩ cm) | 70 | 150 | 100 |
|  | Solution*[2] retentivity (ml/m$^2$) | 55 | 50 | 52.5 |
|  | Resistivity*[3] against alkali | Unchanged Decreased by 0.2 wt % | Deformed by contraction Decreased by 7 wt % | Slightly deformed by contraction Decreased by 1 wt % |
| Characteristic of the cell | Solution-*[4] leaked cell | 3 | 25 | 10 |

TABLE 3-continued

|  | Examples 4 and 5 | Comparative Examples 6 and 8 | Comparative Examples 7 and 9 |
|---|---|---|---|
| (number) |  |  |  |

*1: Measured in 50% by weight of KOH solution at 30° C.
*2: Volume of 50% by weight of KOH solution needed until the solution starts to drip down from the separator after dripping the solution onto the separator.
*3: Condition after immersing the separator in 50% by weight of KOH solution at 80° C. for 5 hours and the decreased rate of the weight.
*4: The number of the cells (out of 100 pieces of the tested cells) which generated leakage of electrolytic solution during the storage test lasted for 120 days at 45° C. and 90% RH.

EXAMPLE 6

First, the inventors immersed a lengthy non-woven fabric made of nylon 66 in an aqueous emulsion containing 7% by weight of titania produced by the Preparation Example, 7% by weight of polyvinyl alcohol (PVA), and 2% by weight of carboxymethyl cellulose (CMC), and then thermally dried the wet fabric at 120° C. for 2 hours. The dried fabric contained 5% by weight of titania fine particles.

Next, using the separator made of the above titania-contained non-woven fabric, electrolytic solution containing 40% KOH solution, and electrodes made of zinc and oxidized solver ($Ag_2O$), the inventors produced AA-size oxidized-silver cells.

Figure 4:
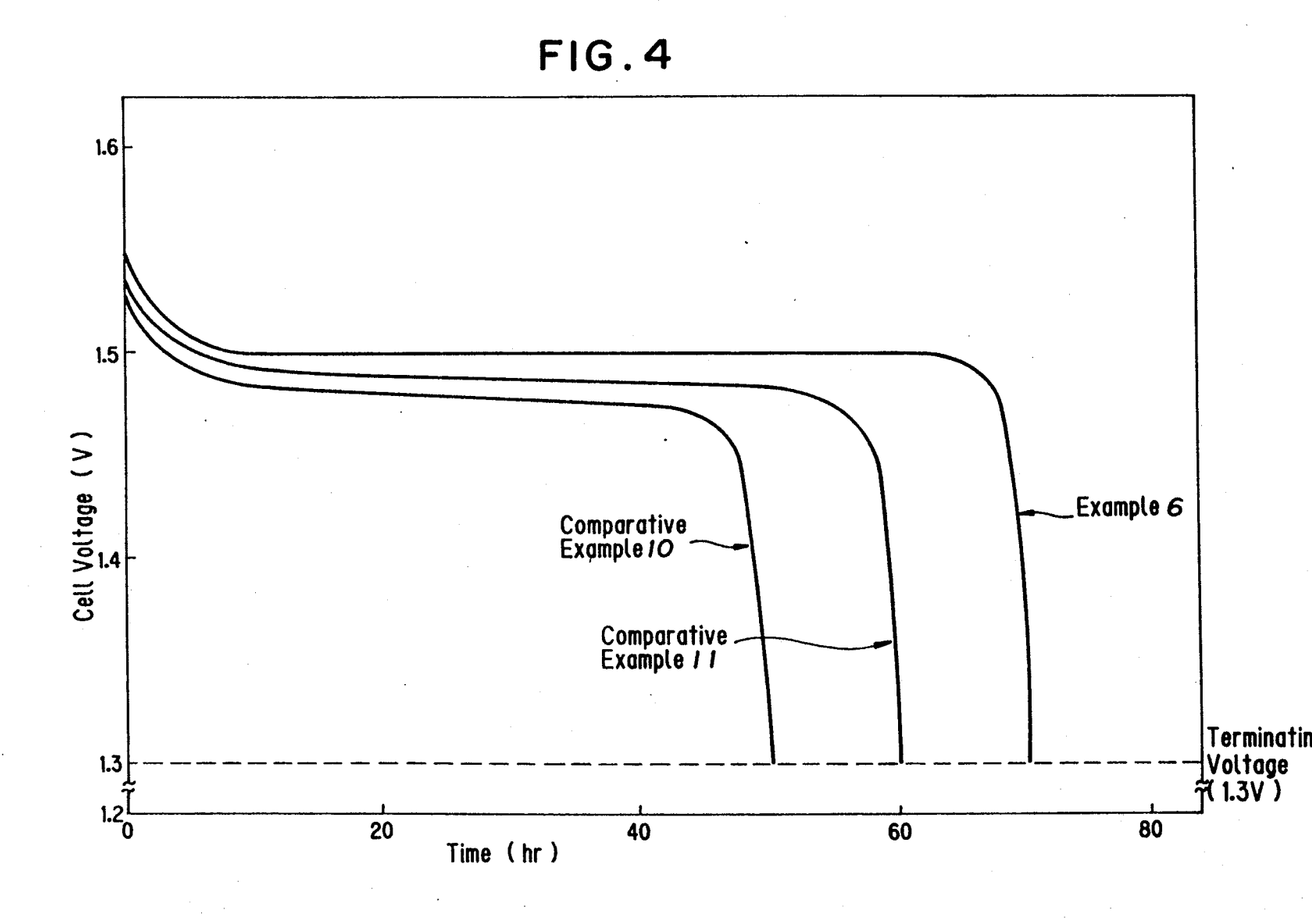
FIG. 4 depicts the discharge characteristic of oxidized silver cells.

Then, using the cell charger/discharger mentioned earlier, the inventors continuously discharged 500-ohm of constant resistance from the charged oxidized-silver cells at room temperature (20±2° C.). The test results of the discharge characteristic is shown in FIG. 4. It took 70 hours before the cell voltage eventually lowered to 1.3 VDC of the terminating voltage, thus proving a satisfactory discharge characteristic, which was superior to that which was achieved by the following Comparative Examples 10 and 11.

Table 4 shows the characteristics of the separator and the oxidized-silver cells. The inventors confirmed that the oxidized-silver cell produced by the Example 6 was superior to those cells produced for the following Comparative Examples 10 and 11 with respect to the electrical resistance of the separator, retentivity of electrolytic solution, resistivity against alkali, prevention of leakage of electrolytic solution from the cell, and in the internal resistance. It is likely that, by virtue of the advantageous properties, the oxidized-silver cells produced by the Example 6 proved to have quite satisfactory cell characteristics.

COMPARATIVE EXAMPLE 10

Except for the deletion of the titania fine particles from the separator composed of nylon-66 non-woven fabric used for the Example 6, following the same way as was done for the Example 6, the inventors produced the oxidized-silver cells, and then checked the discharge characteristic and the characteristics of the separator and the cell. Test results are shown in FIG. 4 and Table 4.

It took 50 hours before the cell voltage eventually lowered of 1.3 VDC compared to the terminating voltage, thus proving the inferiority to the discharge characteristic of the corresponding cells produced by the Example 6.

COMPARATIVE EXAMPLE 11

Except for the introduction of commercially available titania (P-25, a product of Degussa Company, which was also used for the Comparative Example 7) instead of using the titania produced by the Preparation Example, in the same way as was done for the Example 6, the inventors produced a separator made of the titania-contained non-woven fabric. The inventors then produced the oxidized-silver cells. Next, the inventors checked the discharge characteristic and overall characteristics of the separator and the oxidized-silver cells. Test results are shown in FIG. 4 and Table 4.

It took 60 hours before the cell voltage eventually lowered to 1.3 VDC of the terminating voltage. Although being superior to the result of the Comparative Example 10, the discharge characteristic of the cells of the Comparative Example 11 was not as satisfactory as that which was proven by the Example 6.

TABLE 4

|  |  | Example 6 | Comparative Example 10 | Comparative Example 11 |
|---|---|---|---|---|
| Electrode |  | $Zn—Ag_2O$ | $Zn—Ag_2O$ | $Zn—Ag_2O$ |
| Used titanium dioxide |  | Preparation Example | — | Commercially Available Product |
| Characteristic of the separator | Electrical*1 resistance (mΩ cm) | 70 | 150 | 100 |
|  | Solution*2 retentivity (ml/m²) | 55 | 50 | 52.5 |
|  | Resistivity*3 against alkali | Unchanged Decreased by 0.2 wt % | Deformed by contraction Decreased by 7 wt % | Slightly deformed by contraction Decreased by 1 wt % |
| Characteristic of the cell | Solution-*4 leaked cell (number) | 3 | 25 | 10 |
|  | Internal resistance (Ω) | 3.0 | 4.2 | 3.6 |

*1 through *4: Descriptions are exactly identical to those of *1 through *4 related to Table 3.

EXAMPLE 7

First, the inventors immersed a lengthy non-woven fabric made of nylon 66 in an aqueous emulsion containing 7% by weight of titania particles produced by the Preparation Example, 7% by weight of polyvinyl alcohol (PVA), and 2% by weight of carboxymethyl cellulose (CMC), and then thermally dried the wet fabric at 120° C. for 2 hours. The dried fabric contained 5% by weight of titania particles.

Next, the inventors produced AA-size oxidized mercury cells by applying the separator made of the titania-contained non-woven fabric, an electrolytic solution containing 40% KOH solution, and electrodes made from zinc and oxidized mercury.

Figure 5:
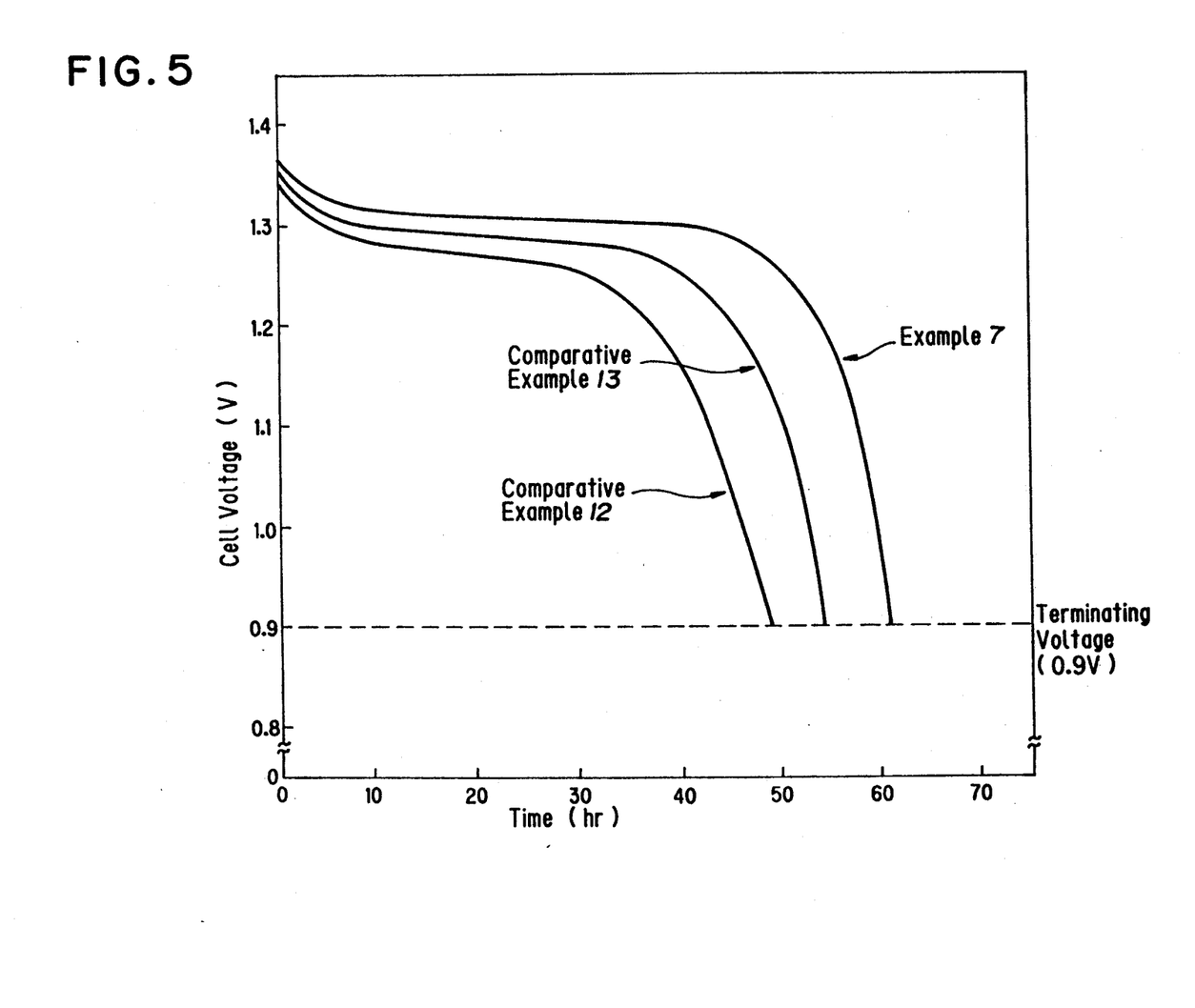
FIG. 5 depicts the discharge characteristic of oxidized mercury cells.

Using the cell charger/discharger mentioned above, inventors continuously discharged 1.3 Kohm of constant resistance from the oxidized mercury cells at room temperature (20±2° C.). The test results are shown in FIG. 5.

It took 60 hours before the cell voltage eventually lowered to 0.9 VDC of the terminating voltage, thus proving a more satisfactory discharge characteristic than that was achieved by the following Comparative Examples 12 and 13.

Table 5 shows the performance characteristics of the separator and the oxidized mercury cell produced by the Example 7. These cells generated more satisfactory performance characteristics with respect to the electrical resistance of the separator, retentivity of electrolytic solution, resistivity against alkali, prevention of the leakage of electrolytic solution, and in the internal resistance, than those of the following Comparative Examples 12 and 13. It is likely that, by virtue of these advantageous properties, the oxidized mercury cell produced by the Example 7 generated quite satisfactory cell characteristics.

COMPARATIVE EXAMPLE 12

Except for the deletion of the titania fine particles from the separator composed of nylon 66 non-woven fabric used for the Example 7, following the same way as was done for the Example 7, the inventors produced oxidized mercury cells. The inventors then checked the discharge characteristics and overall characteristics of the separator and the oxidized mercury cells. The test results are shown in FIG. 5 and Table 5.

It took 50 hours before the cell voltage eventually lowered to 0.9 VDC of the terminating voltage, thus proving the inferiority with respect to the discharge characteristics of the corresponding cells produced by the Example 7.

COMPARATIVE EXAMPLE 13

Except for the introduction of commercially available titania (P-25, a product of Degussa Company, which was also used for the Comparative Example 7) instead of using the titania produced by the Preparation Example 1, in a same way as was done for the Example 7, the inventors produced the separator made of the titania-contained non-woven fabric. The inventors then produced oxidized-mercury cells. Next, the inventors checked the discharge characteristics and overall characteristics of the separator and the oxidized-mercury cells. Test results are shown in FIG. 5 and Table 5.

It took 55 hours before the cell voltage eventually lowered to 0.9 VDC of the terminating voltage. Although being superior to the results of the Comparative Example 12, the discharge characteristics of the cells of the Comparative Example 13 which were not as satisfactory as that was proven by the Example 7.

TABLE 5

| | | Example 7 | Comparative Example 12 | Comparative Example 13 |
|---|---|---|---|---|
| Electrode | | Zn—HgO | Zn—Hgo | Zn—Hgo |
| Used titanium dioxide | | Preparation Example | — | Commercially Available Product |
| Characteristic of the separator | Electrical*1 resistance (mΩ cm) | 70 | 150 | 100 |
| | Solution*2 retentivity (ml/m$^2$) | 55 | 50 | 52.5 |
| | Resistivity*3 against alkali | Unchanged Decreased by 0.2 wt % | Deformed by contraction Decreased by 7 wt % | Slightly deformed by contraction Decreased by 1 wt % |
| Characteristic of the cell | Solution-*4 leaked cell (number) | 3 | 25 | 10 |
| | Internal resistance (Ω) | 3.0 | 4.2 | 3.6 |

*1 through *4: Descriptions are exactly identical to those of *1 through *4 of Table 3.

EXAMPLE 8

First, the inventors immersed a lengthy non-woven fabric made of nylon 66 in an aqueous emulsion containing 7% by weight of titania fine particles produced by the preparation Example, 7% by weight of polyvinyl alcohol, and 2% by weight of carboxymethyl cellulose (CMC), and then thermally dried the wet fabric at 120° C. for 2 hours. The dried fabric contained 5% by weight of the titania ingredient.

Next, the inventors produced AA-size air cells by applying the separator made of the titania-contained non-woven fabric, an electrolytic solution containing 40% KOH solution and the negative electrode made from zinc.

Figure 6:
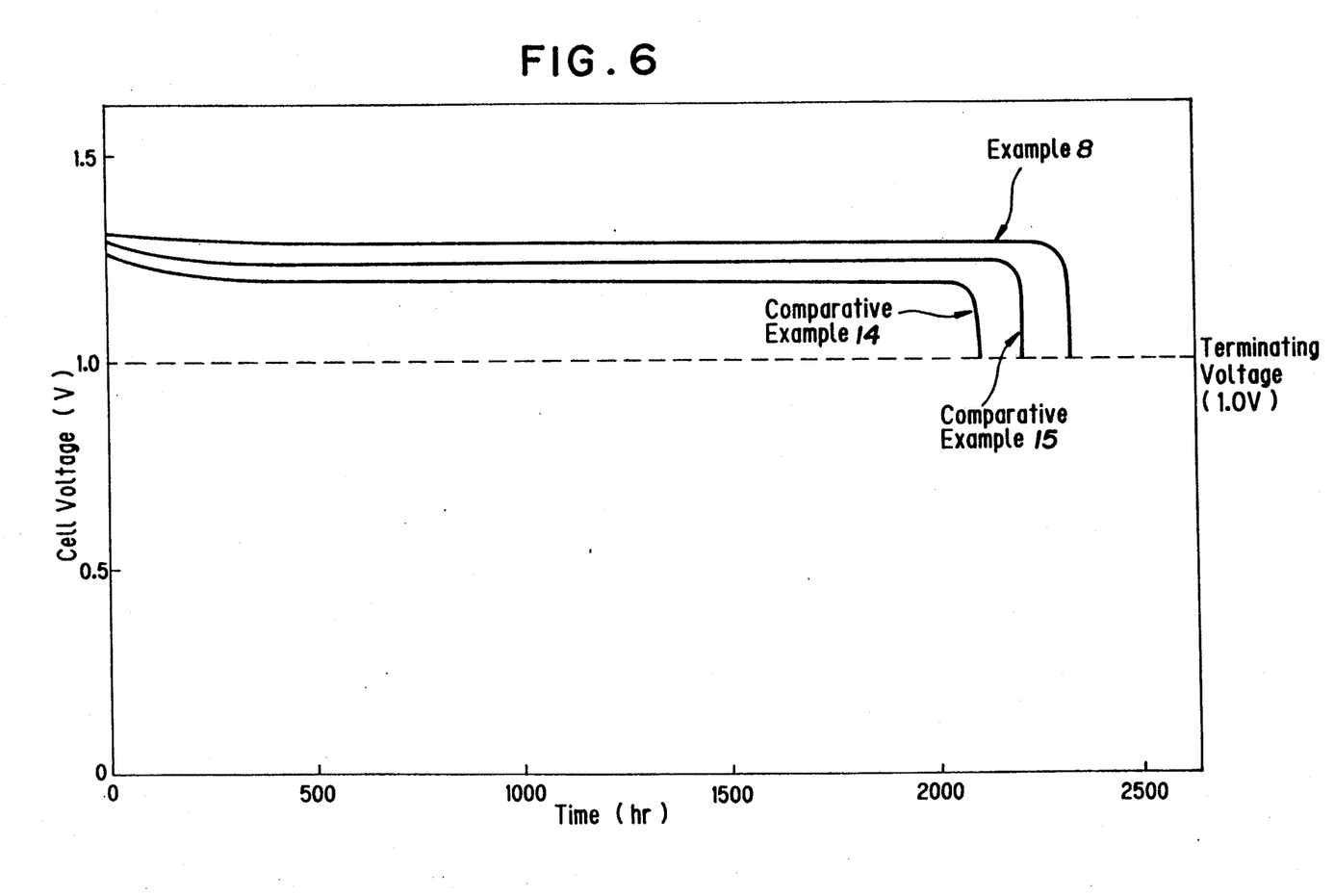
FIG. 6 depicts the discharge characteristic of air cells.

The inventors continuously discharged 6.5 Kohm of constant resistance from the air-cells by applying the cell charger/discharger at room temperature (20±2° C.). The test results are shown in FIG. 6. It took 2,300 hours before the cell voltage eventually lowered to 1.0

VDC of the terminating voltage. The air-cell proved to have quite a satisfactory discharge characteristic compared to the following Comparative Examples 14 and 15.

Table 6 shows the performance characteristics of the separator and the air-cell. The air-cells produced by the Example 8 proved to be superior to the following Comparative Examples 14 and 15 with respect to the electrical resistance of the separator, retentivity of electrolytic solution, resistivity against alkali, prevention of leakage of solution, and in the internal resistance. It is likely that, by virtue of these advantageous properties, the air-cells produced by the Example 8 generated quite satisfactory cell characteristics.

COMPARATIVE EXAMPLE 14

Except for the deletion of titania from the separator made of the nylon-66 non-woven fabric used for the Example 8, in the same way as was done for the Example 8, the inventors produced air-cells, and then checked the discharge characteristics and overall characteristics of the separator and the air-cells. The test results are shown in FIG. 6 and Table 6.

It took 2,100 hours before the cell voltage eventually lowered to 1.0 VDC of the terminating voltage, thus proving the inferiority to that of the air-cells produced by the Example 8.

COMPARATIVE EXAMPLE 15

Except for the introduction of the commercially available titania (P-25, a product of Degussa Company, which was also used for the Comparative Example 7), instead of using the titania particles produced by the first production process, in the same way as was done for the Example 8, the inventors produce a separator composed of the titania-contained non-woven fabric and air-cells as well. The inventors then checked the discharge characteristics and overall characteristics of the separator and the air cells. The test results are shown in FIG. 6 and Table 6.

It took 2,200 hours before the cell voltage eventually lowered to 1.0 VDC of the terminating voltage. Although this result was superior to that of the Comparative Example 14, it was not as satisfactory as that of the air-cell produced by the Example 8.

TABLE 6

|  |  | Example 8 | Comparative Example 14 | Comparative Example 15 |
|---|---|---|---|---|
| Electrode |  | Zn—O$_2$ | Zn—O$_2$ | Zn—O$_2$ |
| Used titanium dioxide |  | Preparation Example | — | Commercially Available Product |
| Characteristic of the separator | Electrical*[1] resistance (mΩ cm) | 70 | 150 | 100 |
|  | Solution*[2] retentivity (ml/m$^2$) | 55 | 50 | 52.5 |
|  | Resistivity*[3] against alkali | Unchanged Decreased by 0.2 wt % | Deformed by contraction Decreased by 7 wt % | Slightly deformed by contraction Decreased by 1 wt % |
| Characteristic of the cell | Solution-*[4] leaked cell (number) | 3 | 25 | 10 |
|  | Internal resistance (Ω) | 3.0 | 4.2 | 3.6 |

*[1] through *[4]: Descriptions are exactly identical to those of *[1] through *[4] of Table 3.

What is claimed is:

1. A separator which is used for preparing an alkaline cell comprising a substrate of a separator and from 0.1 to 10% by weight, based on the weight of the substrate of the separator, of ultra-fine particles, said ultra-fine particles consists essentially of titanium dioxide, hydrated titanium dioxide or a mixture thereof, and wherein each particle is substantially amorphous and has a primary particle diameter of a maximum of 500 Å and a specific surface area of a minimum of 100 square meters per gram.

2. The separator as claimed in claim 1, wherein said alkaline cell is a secondary alkaline cell.

3. The separator as claimed in claim 2, wherein said secondary alkaline cell is a nickel-cadmium closed type secondary alkaline cell or a nickel-zinc closed type secondary alkaline cell.

4. The separator as claimed in claim 1, wherein said alkaline cell is a primary alkaline cell.

5. An alkaline cell comprising a separator, said separator comprising a substrate of a separator and from 0.1 to 10% by weight, based on the weight of the substrate of the separator, of ultra-fine particles, said ultra-fine particles consists essentially of titanium dioxide, hydrated titanium dioxide or a mixture thereof, and wherein each particle is substantially amorphous and has a maximum primary particle diameter of 500 Å and a specific surface area of a minimum of 100 square meters per gram.

6. The alkaline cell as claimed in claim 5, wherein said alkaline cell is a secondary alkaline cell.

7. The alkaline cell as claimed in claim 5, wherein said alkaline cell is a primary alkaline cell.

8. The separator as claimed in claim 1, wherein the substrate is a non-woven fabric.

9. The separator as claimed in claim 1, wherein the substrate is selected from the group consisting of a fabric or a film.

10. The separator as claimed in claim 9, wherein the substrate is made from a material selected from the group consisting of a polyamide resin, polyethylene, polypropylene, an acrylic resin, polytetrafluoroethylene, polyvinyl alcohol and cotton.

11. The separator as claimed in claim 10, wherein said primary particle diameter is 100 to 300 Å.

12. The separator as claimed in claim 1, wherein said specific surface area is a minimum of 120 m$^2$/g.

13. The separator according to claim 11, wherein said specific surface area is a minimum of 120 m²/g.

14. The separator as claimed in claim 1, wherein said ultra fine particles are contained in an amount of 0.5 to 5 weight %, based on the weight of the separator.

15. The separator as claimed in claim 13, wherein said ultra fine particles are contained in an amount of 0.5 to 5 weight %, based on the weight of the separator.

16. The separator as claimed in claim 2, wherein said secondary alkaline cell is selected from the group consisting of a nickel-cadmium closed type secondary alkaline cell, a nickel-zinc closed type secondary alkaline cell, a nickel-hydrogen closed type alkaline cell, an iron-nickel secondary alkaline cell, a zinc-air secondary alkaline cell, and an aluminum-air secondary alkaline cell.

17. The separator as claimed in claim 4, wherein the primary alkaline cell is selected from the group consisting of an alkaline-manganese dry cell, an oxidized silver cell, a mercury cell and an air cell.

18. The separator of claim 12, wherein said substrate is a fabric selected from the group consisting of polyamide fabric and polypropylene fabric.

19. The separator as claimed in claim 18, wherein said substrate is a non-woven fabric.

20. The separator as claimed in claim 19, wherein said substrate is a non-woven polyamide.

* * * * *